Figure 5:
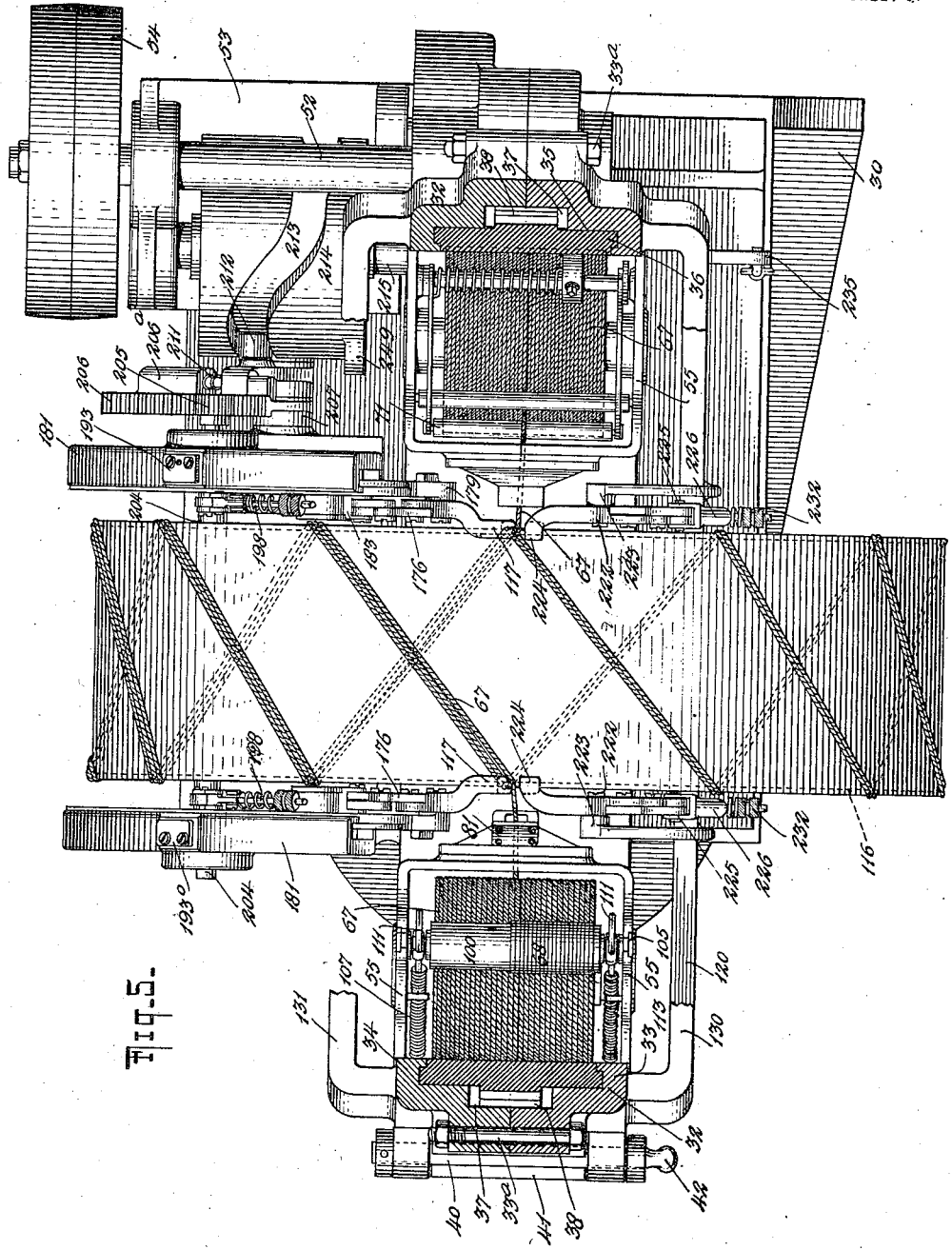

F. B. CARLISLE.
MACHINE FOR MAKING TIRE CASINGS.
APPLICATION FILED SEPT. 26, 1916.
1,296,762.
Patented Mar. 11, 1919.
10 SHEETS—SHEET 1.
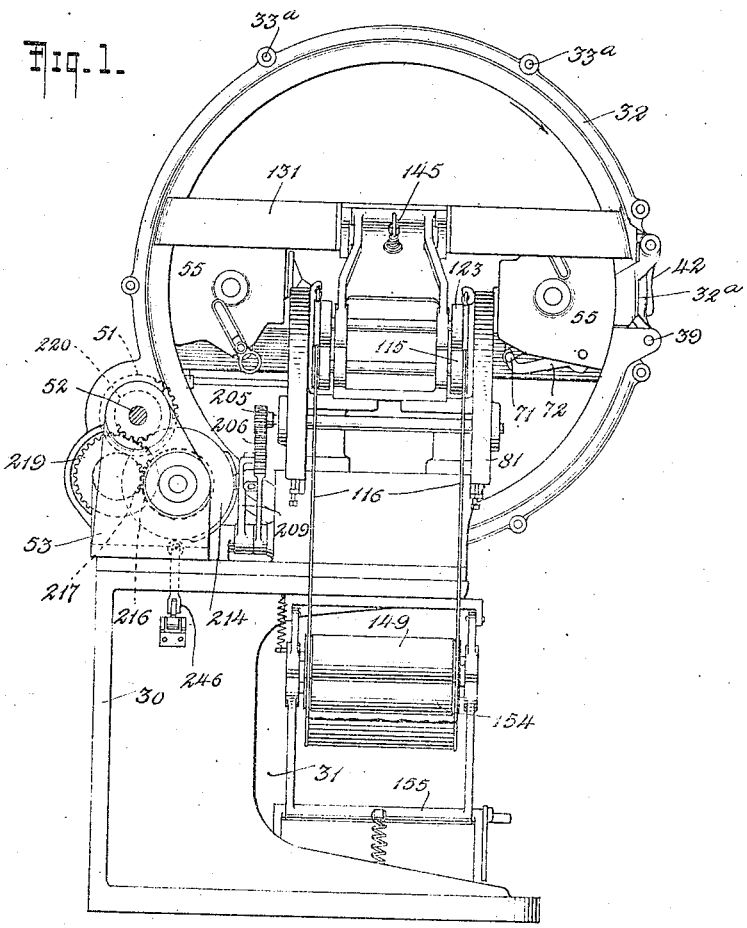
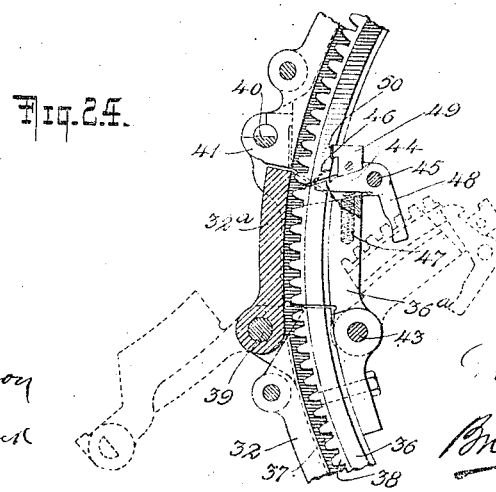

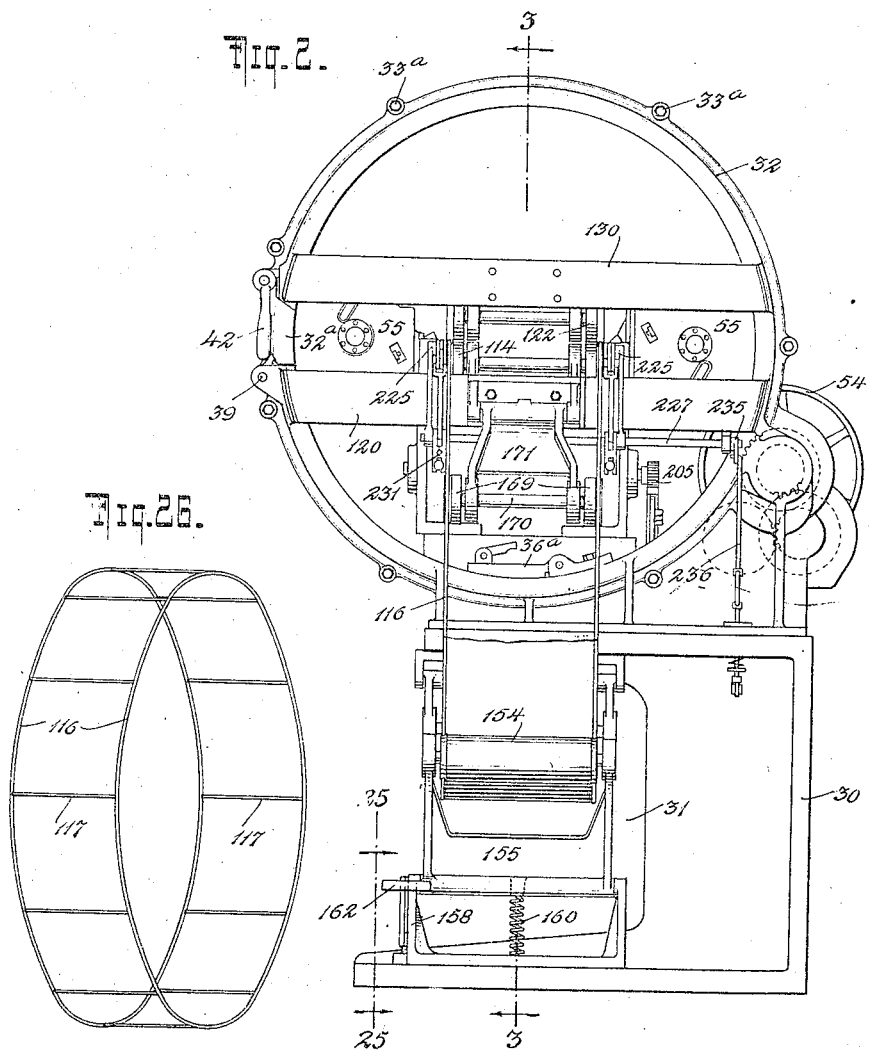
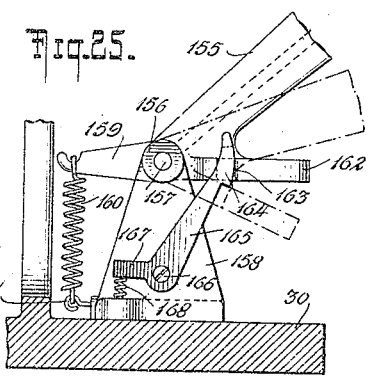

F. B. CARLISLE.
MACHINE FOR MAKING TIRE CASINGS.
APPLICATION FILED SEPT. 26, 1916.
1,296,762.
Patented Mar. 11, 1919.
10 SHEETS—SHEET 3.
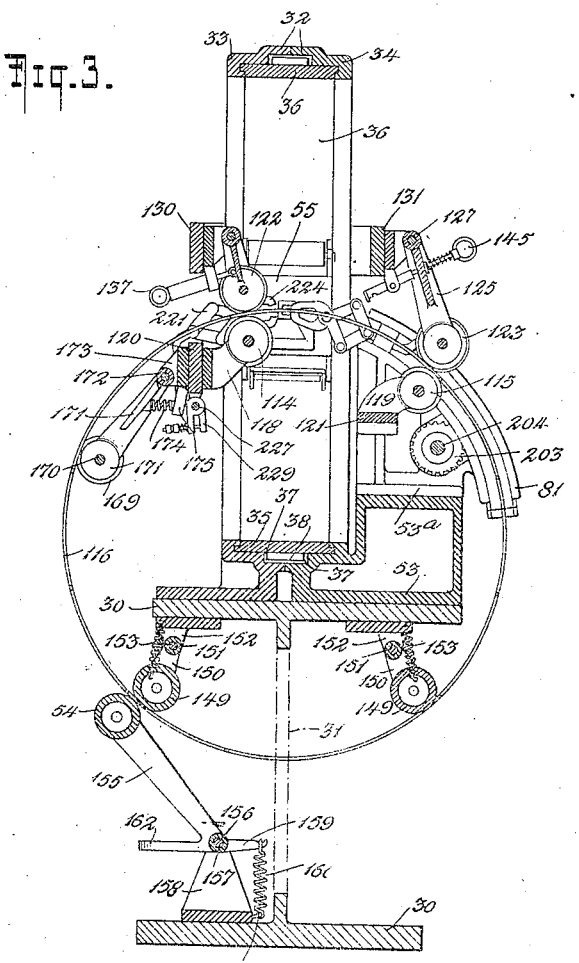
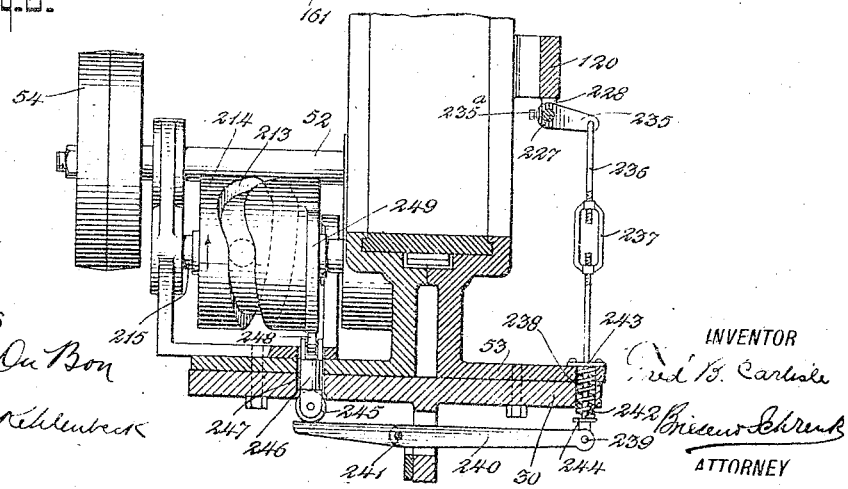

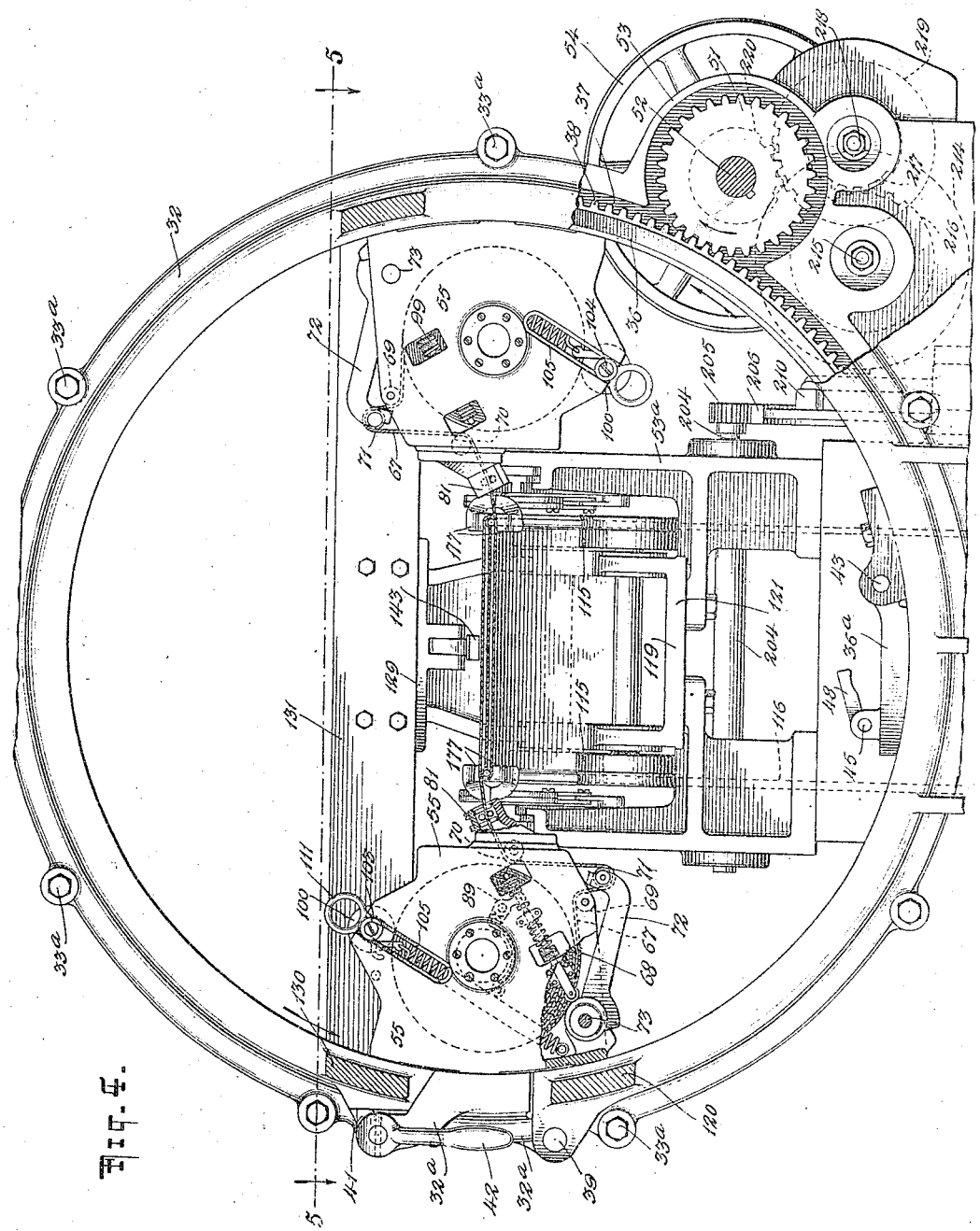

F. B. CARLISLE.
MACHINE FOR MAKING TIRE CASINGS.
APPLICATION FILED SEPT. 26, 1916.

1,296,762.

Patented Mar. 11, 1919.
10 SHEETS—SHEET 5.

WITNESSES

INVENTOR
Fred B. Carlisle
BY
ATTORNEYS

F. B. CARLISLE.
MACHINE FOR MAKING TIRE CASINGS.
APPLICATION FILED SEPT. 26, 1916.
1,296,762.
Patented Mar. 11, 1919.
10 SHEETS—SHEET 6.
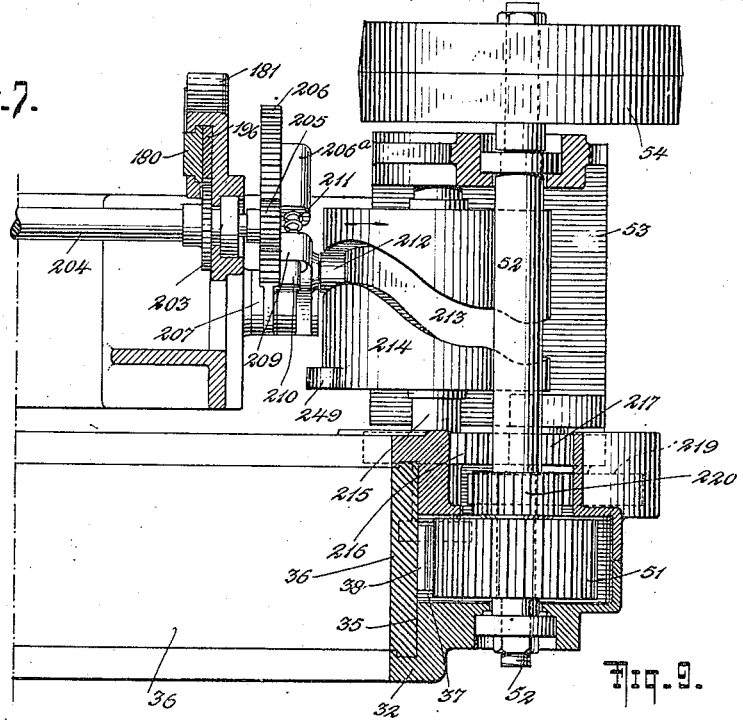
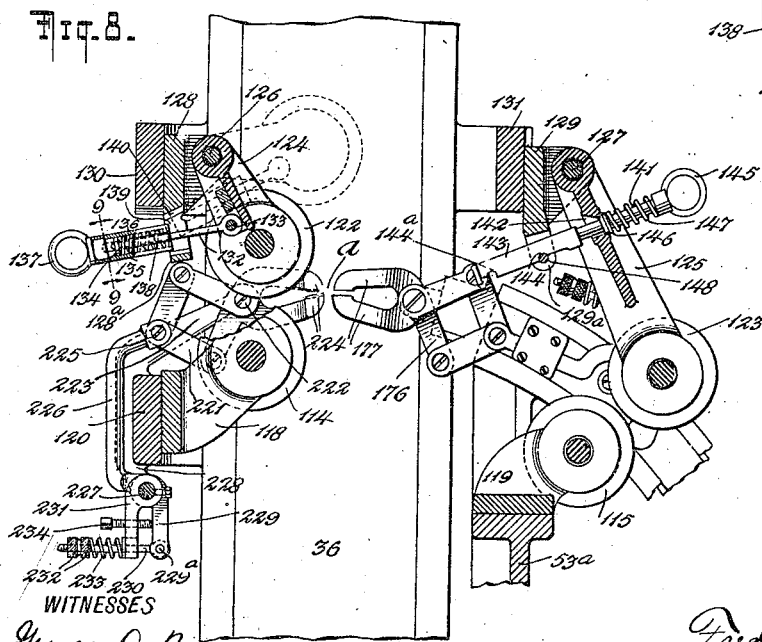
WITNESSES
George DuBon
John A. Kehlenbeck
INVENTOR
Fred B. Carlisle
BY
Briesen & Schrenk
ATTORNEY

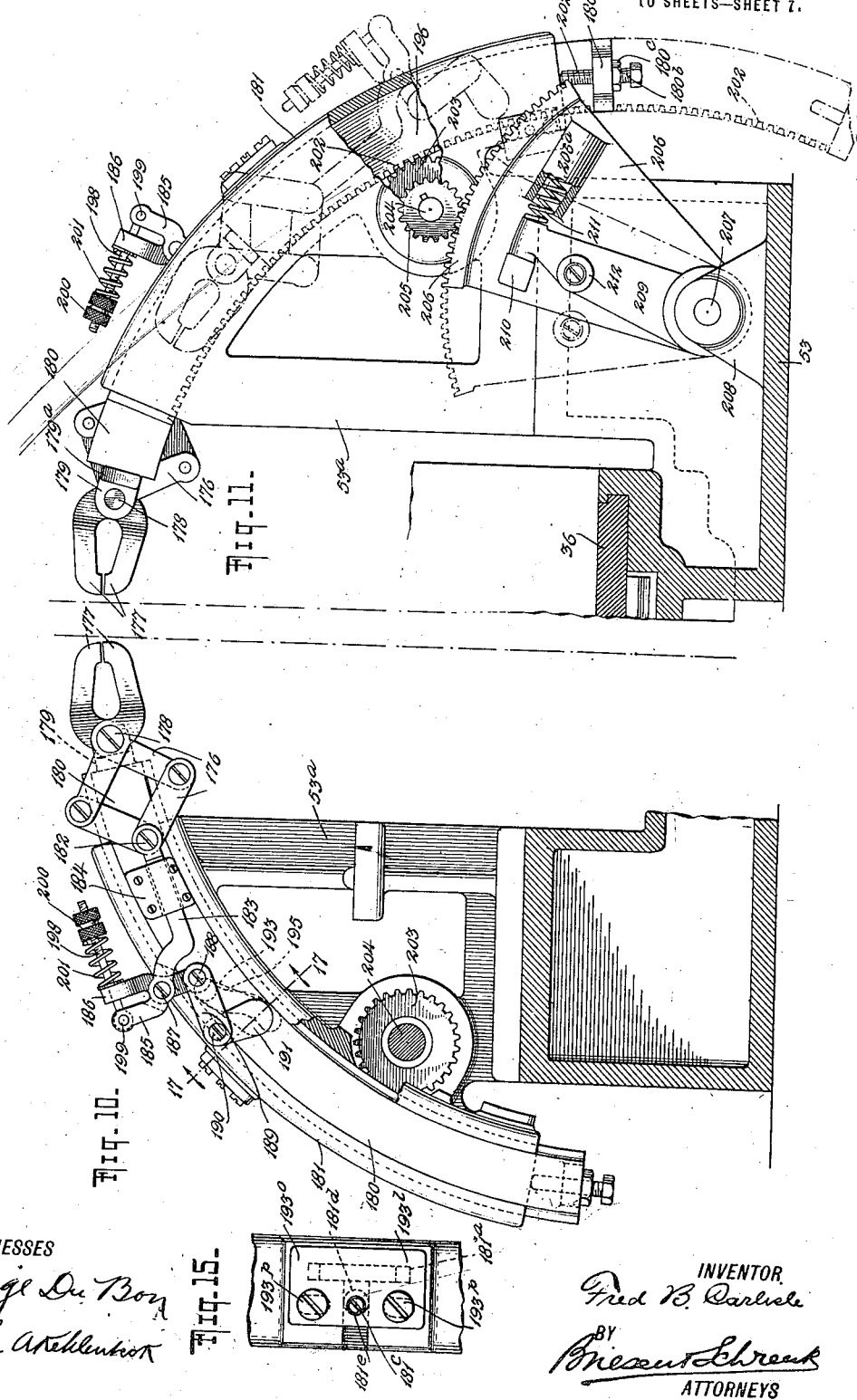

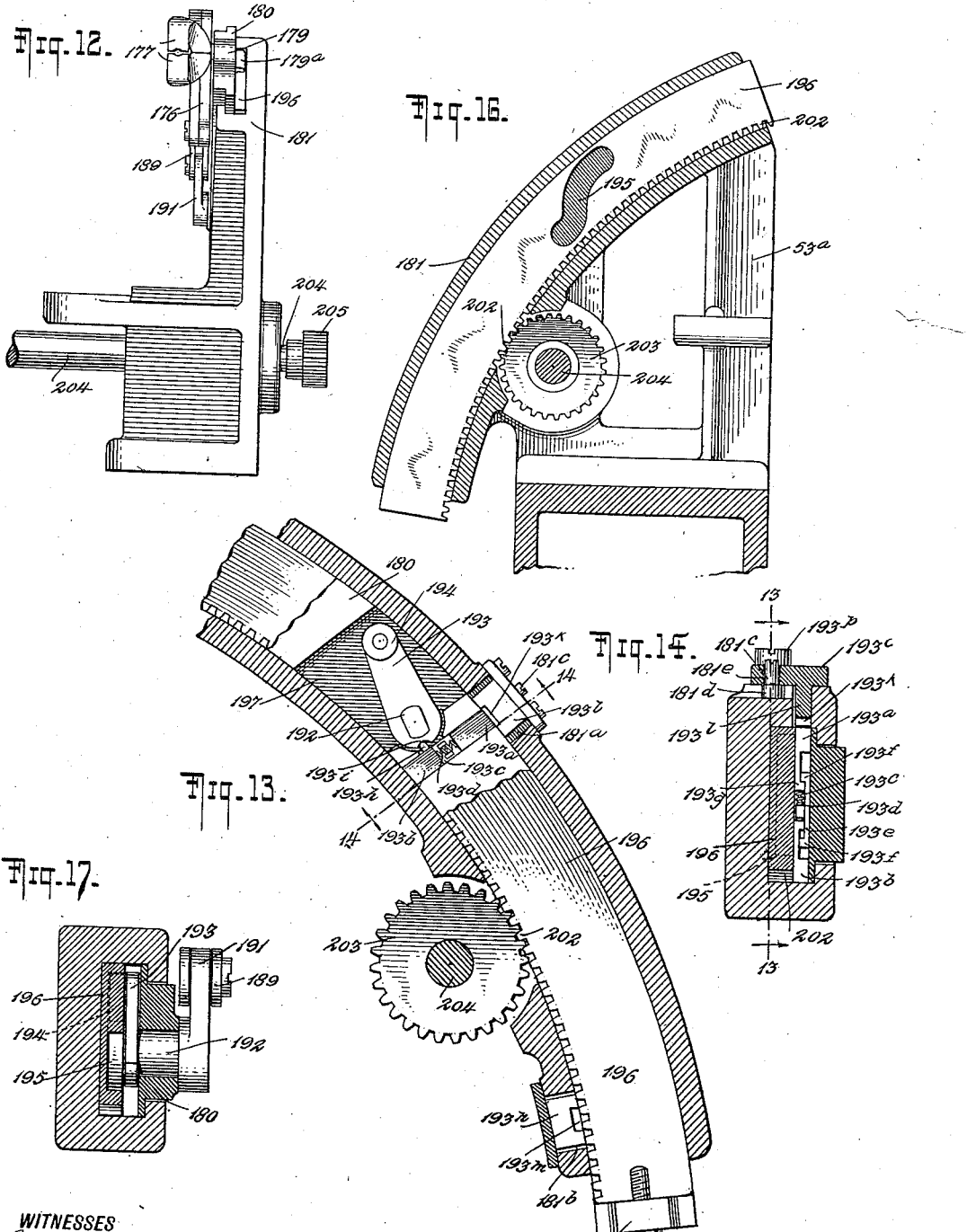

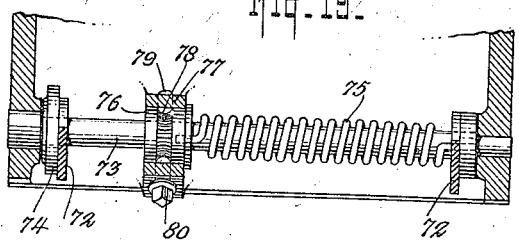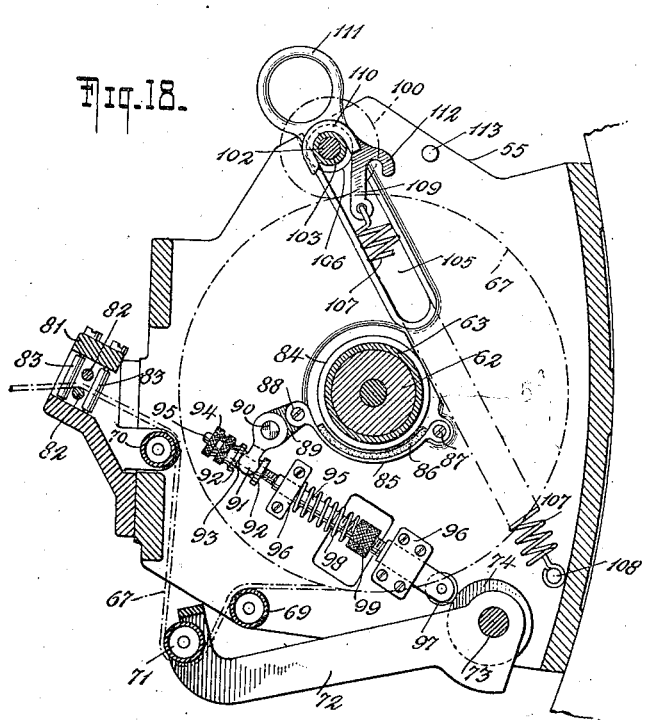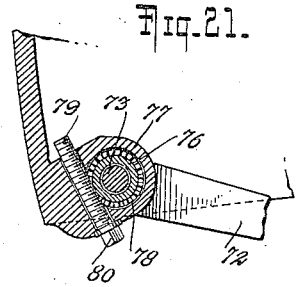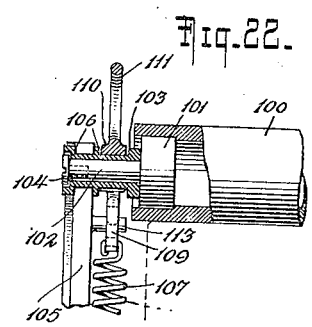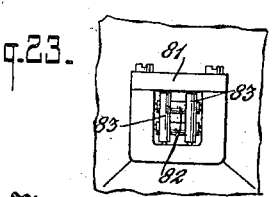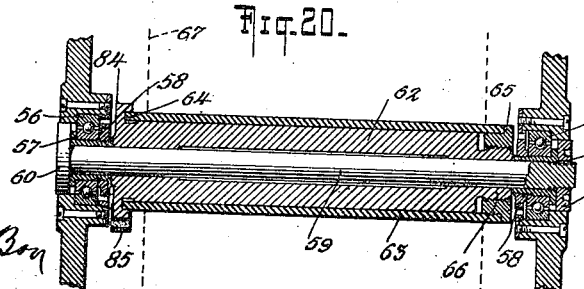

F. B. CARLISLE.
MACHINE FOR MAKING TIRE CASINGS.
APPLICATION FILED SEPT. 26, 1916.
1,296,762.
Patented Mar. 11, 1919.
10 SHEETS—SHEET 10.
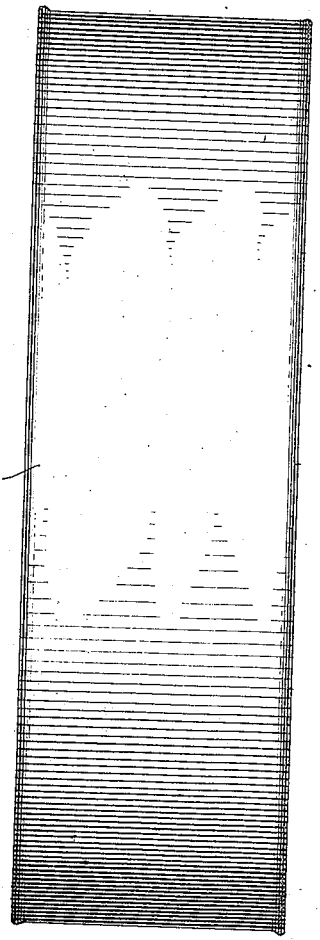
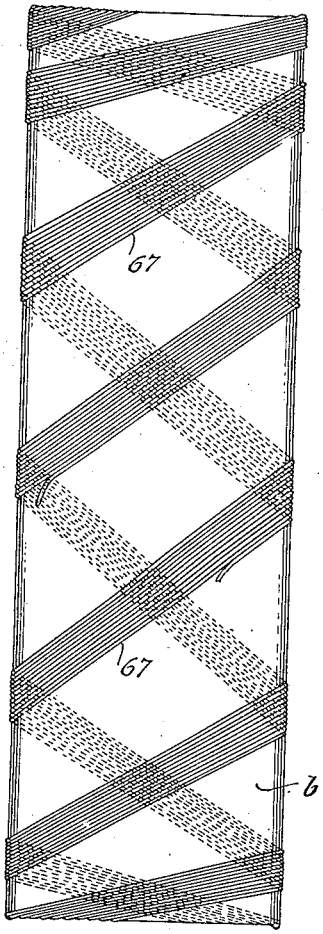
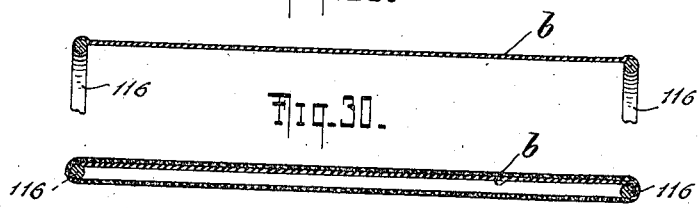
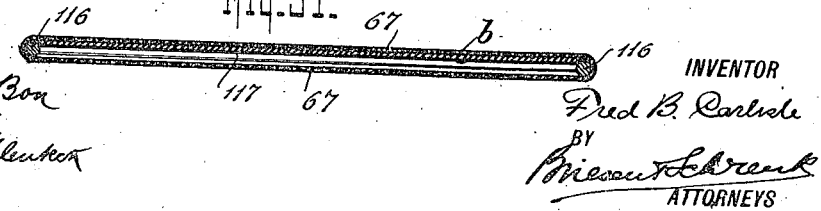

UNITED STATES PATENT OFFICE.

FRED B. CARLISLE, OF NORTH KINGSTON, RHODE ISLAND, ASSIGNOR TO JOSEPH M. GILBERT, OF NEW YORK, N. Y.

MACHINE FOR MAKING TIRE-CASINGS.

1,296,762.  Specification of Letters Patent.  Patented Mar. 11, 1919.

Application filed September 26, 1916. Serial No. 122,195.

*To all whom it may concern:*

Be it known that I, FRED B. CARLISLE, a citizen of the United States, and a resident of North Kingston, county of Washington, State of Rhode Island, have invented certain new and useful Improvements in Machines for Making Tire-Casings, of which the following is a specification.

My invention relates to machines for making casings for pneumatic tires whereby the inner tubes of the type of tires known as "double tube tires" are inclosed and has for its object to provide a simple and effective machine whereby casings including layers of cord or the like may be readily and efficiently constructed. My improvement will be fully described hereinafter and the features of novelty will be pointed out in the appended claims.

In the accompanying drawings which illustrate an example of my invention Figure 1 is an end elevation of my improved machine; Fig. 2 is a similar view looking in the opposite direction; Fig. 3 is a sectional view on the line 3—3 of Fig. 2; Fig. 4 is an enlarged detail view partly in section and similar to Fig. 2; Fig. 5 is a horizontal section taken on the line 5—5 of Fig. 4; Fig. 6 is a detail elevation partly in section of the driving mechanism; Fig. 7 is a detail plan view thereof partly in section; Fig. 8 is a detail sectional elevation of the gripping mechanism; Fig. 9 is a detail section on the line 9—9 of Fig. 8; Figs. 10 and 11 are additional detail elevations of the gripping mechanisms; Fig. 12 is a view looking at right angles to Fig. 10; Fig. 13 is a detail section on the line 13—13 of Fig. 14; Fig. 14 is a similar view on the line 14—14 of Fig. 13; Fig. 15 is a detail view of an adjusting mechanism shown in Figs. 13 and 14; Fig. 16 is a detail face view of a portion of Fig. 10 with parts broken away; Fig. 17 is a detail section on the line 17—17 of Fig. 10; Fig. 18 is a detail section of the cord carrying and delivery mechanism: Figs. 19, 20, 21, 22 and 23 are additional detail views of the cord carrying and delivery mechanism; Fig. 24 is a detail sectional view of a locking means forming part of my improvement, Fig. 25 is a detail sectional view of another locking device on the line 25—25 of Fig. 2; Fig. 26 is a perspective view of the rings upon which the casing is built up; and Figs. 27, 28, 29, 30 and 31 are detail elevations and sections respectively of the product of the machine at various stages of its construction.

As shown in the drawings the machine comprises a base or support 30 which is constructed of any suitable material and is preferably recessed for instance as indicated at 31. The base 30 forms a support for a circular frame 32 comprising two mating sections 33 and 34 connected together for instance by means of bolts 33$^a$ and rigidly secured to said base in any suitable manner. The sections 33 and 34 are formed with corresponding annular recesses, which, when said sections are operatively combined form an annular raceway 35 in which a circular member 36 is movable in a circumferential direction, said sections being further constructed to form an annular recess 37 extending about and communicating with the raceway 35 for the accommodation of the gear teeth 38 located on the outer surface of the member 36 as shown in Figs. 3 and 4. The frame 32 is provided with a section 32$^a$ which is pivoted at 39 and is locked in its operative position in any suitable manner as for instance by means of a semi-circular bolt 40 rotatably mounted on said section and adapted to coöperate with a recessed member 41 forming part of or secured to the adjacent portion of the frame 32. In order to facilitate the actuation of said bolt 40 it may be provided with a suitable handle 42, it being understood that in its normal position as shown in Fig. 24 the bolt 40 in coöperation with the recessed member 41 firmly locks the section 32$^a$ in operative position in which the circumferential continuity of the frame 32 is complete. If the handle 42 is swung upward from the position shown in Fig. 4 through an arc of approximately 180° the bolt 40 will be rotated to a position in which it may readily move out of the recessed member 41, as will be readily apparent from Fig. 24, thus permitting the section 32$^a$ to be pivotally moved out of the frame 32 to the dotted position shown in Fig. 24 when this is desired. The circular member 36 is similarly provided with a section 36$^a$ which is pivoted at 43 and carries a latch 44 pivoted at 45 and adapted to coöperate with a notch 46 formed in the adjacent portion of the member 36 to lock said section 36$^a$ against pivotal movement. The said latch 44 is maintained in and returned to its locking position by means of a spring 47 or any other suitable means and is preferably provided with a continuing arm 48 for the purpose of moving said latch 44 to an inoperative position against the tension of the spring 47. In its normal position the section 36ᵃ preserves the circumferential continuity of the member 36, it being understood that the gear teeth 38 are continued along said member and that the latter may be pivotally swung inwardly out of the member 36 to the position shown by dotted lines in Fig. 24 when necessary. In order to prevent any strains which may occur during the operation of the machine from clamping the section 36ᵃ between the adjacent ends of the member 36 and thus wedging it against pivotal movement, said section 36ᵃ may be provided with a rigid lug 49 adapted to enter a depression 50 of the member 36. The lug 49 in coöperation with the pivot 43 and the section 36ᵃ itself thus serves as a spreader as it were whereby the ends of the member 36 adjacent to the section 36ᵃ are prevented from being forced toward each other under any strains which may occur in a circumferential direction. The parts are so proportioned that with this arrangement the section 36ᵃ is prevented from becoming clamped between the ends of the member 36 and is thus capable of being swung out of said member with a minimum of effort when this is desired. The purpose of the movable sections 32ᵃ and 36ᵃ will more clearly appear from the description hereinafter.

The gear teeth 38 of the member 36 are in mesh with a gear wheel 51 carried by the driving shaft 52, the latter being journaled in a support 53 forming part of the frame 32 and also supported on the base 30. The driving shaft 52 may be actuated in any convenient manner as for instance by means of a pulley 54 secured upon said shaft and adapted to be rotated by means of a suitable belt in the customary manner.

At diametrically opposite points the member 36 carries boxes or casings 55 which themselves are provided with oppositely located and axially alining ball bearings 56 in which flanged bearing sleeves 57 are detachably clamped by means of nuts 58 as shown best in Fig. 20. The said sleeves 57 are adapted to receive a shaft 59 which is formed with a head 60 at one end and is screw-threaded at its other end to receive a nut 61 which in coöperation with the head 60 serves to secure the shaft 59 and sleeves 57 together to rotate with the movable members of the ball bearings 56. The shaft 59 in each casing 55 in turn carries a spindle 62 which may simply frictionally engage said shaft or be otherwise connected therewith so that both spindle and shaft will rotate in unison, the spindle being preferably inclosed in a wearing sleeve 63 detachably held in position in any suitable manner as for instance by having its one end located in an annular recess 64 and its other end engaged by a nut 65 screwed upon the reduced screw-threaded end 66 of said spindle as shown in Fig. 20. The spindles 62 are each arranged to support a supply of cord 67 preferably impregnated with rubber or a rubber compound and wound upon the wearing sleeve 63 and if necessary having a strip of fabric 68 combined therewith so as to lie between the windings of cord and thus prevent the latter from sticking together owing to their more or less tacky condition. The casings 55 carry guide rollers 69 and 79 and are further provided with tension rollers 71 mounted upon tension arms 72 located in pairs upon two rock shafts 73 rotatably mounted in said casings and also carrying cams 74 the purpose of which will appear more fully hereinafter. One arm 72 of each pair is connected with one end of a torsional spring 75, one of which surrounds each shaft 73 and has its other end connected with a collar 76 loosely mounted upon each shaft 73 and rotatably located within a rigid projection 77 located on each casing 55, said collars being each formed with a worm gear 78 as shown in Figs. 19 and 21. Each worm gear 78 is in operative engagement with a screw-threaded bolt 79 rotatably mounted in the projection 77 but held therein against any other movement and having a head 80 for the accommodation of a suitable tool to manipulate said bolt, a rotation of which brings about a rotation of the coöperating collar 76 whereby the torsional tension of the springs 75 is adjusted. These springs are so arranged that the torsional tension exerted thereby always tends to throw the arms 72 outward and away from the casings 55 and also overcomes the tendency of said arms to pivotally move inward or drop down as each casing 55 travels in an upward path during the actuation of the member 36. The casings 55 are further provided with outlet boxings 81 in which rollers 82 and 83 are rotatably mounted, the rollers 82 being rotatable about horizontal axes while the rollers 83 are rotatable about axes which extend transversely to the axes of the rollers 82. As shown in Fig. 18 all of said rollers in each boxing 81 are grouped together to form an exit or guide opening for the cords 67 the latter passing out between said rollers with a minimum of effort and friction. In order that too rapid or an undesired rotation of the spindles 62 carrying the cords 67 may be prevented, the said spindles are provided with annular braking surfaces 84 coöperating with brakes 85 having braking cushions 86 and having an end pivoted at 87 in the casings 55. The opposite ends of said brakes 85 are pivotally connected at 88 with elbow levers 89 pivoted at 90 in said casings and formed with rounded ends 91 located between annular flanges 92 of internally screw-threaded sleeves 93 having knurled operating heads 94 as shown in Fig. 18. The sleeves 93 are rotatably mounted upon the screw-threaded ends of rods 95 slidably mounted in bearings 96 rigidly carried by the casings 55, said rods having rollers 97 located at one end in surface engagement with the cams 74 carried by the shafts 73. Coil springs 98 surround the rods 95 and have one end bearing against one of the bearings 96 and their other ends engaging nuts 99, the latter being mounted upon screw-threaded portions of the rods 95 and serving to adjust the tension of the springs 98. It will be seen that the positions of the elbow levers 89 may be adjusted by rotating the sleeves 93 upon the rods 95 whereby the positions of the brakes 85 relatively to the surfaces 84 are changed and that the degree of pressure exerted by the rollers 97 upon the cams 74 may be changed by adjusting the nuts 99 to vary the tension of the springs 98.

When it is desired to remove an empty spindle 62 from or to place a full spindle in position in the casings 55 the nuts 61 are simply removed from the shaft 59 thus leaving the latter free to be withdrawn from the sleeves 57 and the spindle to be removed from or placed in the particular casing 55. This removal of the shaft 59 leaves the sleeves 57 in operative connection with the ball bearings 56 and thus at no time disturbs the latter. If the bearings 56 are to be taken apart for any reason it is simply necessary to first remove the shaft 59 and spindle 62 and then to unscrew the nuts 58 which leaves the sleeves 57 free to be withdrawn from the bearings, the latter being then easily taken apart as will be readily apparent from an inspection of Fig. 20.

The casings 55 if desired may also be provided with take-up rollers 100 which are carried by circular heads 101, from which trunnions 102 project in axial directions, said trunnions being journaled in sleeves 103 and held therein against axial movement for instance by means of screws 104. The sleeves 103 are slidably mounted in slots 105 formed in opposite walls of the casings 55 as shown in Fig. 18 and are provided with spaced annular flanges 106 whereby said sleeves and with them the trunnions 102, heads 101 and take-up rollers 100 are held against any material movement in directions transverse to the slots 105. The rollers 100 are maintained in surface engagement with the rolls of cord 67 at all times, and during all changes in the diameters of said cord rolls during the operation of the machine, for instance by means of springs 107 secured at one end to studs 108 rigidly located at suitable points on the casings 55 and having their other ends connected with members 109. The latter are formed with yokes 110 adapted to straddle the sleeves 103 in the operative combination of the parts, thus bringing the rollers 100 under the influence of the springs 107, the tension of which always tends to draw said rollers 100 into surface contact with the rolls of cord 67 no matter what changes take place in the diameter of the latter during the operation of the machine. The take-up rollers 100 serve to take or wind up the fabric strip 68 when the latter is included and located between the convolutions or layers of the cord 67 in the manner to be more fully described later in the description. In order that the rollers 100 may be easily removed from the machine when full or placed in position therein, the yokes 110 are continued in the form of handles 111 and the members 109 are formed with hooks 112. With this arrangement the yokes 110, may be easily removed or lifted from the sleeves 103 against the tension of the springs 107, through the medium of the handles 111, thus leaving the sleeves 103, with the rollers 100, free to be lifted out of the slots 105. When the springs 107 and yokes 110 are detached from the sleeves as described, the hooks 112 may be engaged with stationary lugs 113 located on the casings 55 as shown in Fig. 18, whereby said springs are always maintained in a position of ready accessibility and in proper connection with the casings 55.

The machine further includes supporting rollers 114 and 115 for supporting rings 116 upon which the cords 67 are wound to form the tire carcass, said rollers being preferably circumferentially grooved to maintain said rings in constant circular paths during operation of the machine, it being understood that said rings 116 are spaced apart as shown in Figs. 1 and 2. In the preferred arrangement the said rings may be maintained in parallel and spaced relation to each other, for instance by removable spreaders or rods 117 as illustrated in Fig. 26. The rollers 114 and 115 are journaled respectively on brackets 118 and 119 the former being secured to a cross-bar 120 formed integrally with or secured to the frame 32 and extending transversely across the same while the latter brackets form part of a cross-bar 121 carried by a support 53ª mounted on the base 30 and preferably comprising an integral part of the frame 32 or more specifically the member 34 thereof. Pressure rollers 122 and 123 bear against the rings 116 in opposition to the rollers 114 and 115 and serve as an additional means for maintaining said rings in their intended positions, said rollers being carried by members 124 and 125 pivoted respectively at 126 and 127 to lugs 128 and 129 shown in Fig. 8 and secured to cross-bars 130 and 131 similar to the cross-bar 120 and similarly formed integrally with or secured to the frame 32 so as to extend transversely across the same as shown in Figs. 1, 2 and 3. The rollers 122 and 123 are each preferably maintained under a spring tension in any suitable manner, the tension being exerted in a direction tending to draw the said rollers toward the rollers 114 and 115 so that the rings 116 will be effectively clamped between all of said rollers and yet will freely travel thereon in a circumferential direction. As shown best in Fig. 8 the means for maintaining the roller 122 under such tension comprises a stem 132 having a screw-threaded end and pivotally connected at 133 to the member 124 and carrying a nut or the like 134 slidable lengthwise of a tube 135 closed at least at one end, a spring 136 being interposed between said nut 134 and the closed end of said tube 135. The latter is provided at its free end with a handle or ring 137 and is further formed with keys or ribs 138 extending lengthwise thereof at diametrically opposite points. These keys or ribs 138 by bearing against an extension 128ᵃ of the lug 128 serve to place the spring 136 under a tension which in turn is exerted upon the member 124 and thus communicated to the roller 122. In order that said roller 122 may, when desired or necessary, be swung to an inoperative position as shown in dotted lines in Fig. 8, the extension 128ᵃ is formed with an aperture 139 having communicating recesses 140 located at diametrically opposite points, said recesses being of sufficient dimensions to permit the keys or ribs 138 to slide therein, and the upper recess 140 being preferably inclined upwardly at an angle as shown in Fig. 8. Thus when the roller 122 is to be swung to its inoperative position the tube 135, through the medium of the handle 137, is simply given a quarter turn to bring the keys or ribs 138 into registry with said recesses 140, shown best in Fig. 9, whereby the tension on the spring 136 is released and said tube is free to slide in the direction of its length relatively to the aperture 139 thus permitting the member 124 with the roller 122 to be swung on the pivot 126 to the position shown in dotted lines in Fig. 8. A return movement of the member 124 and roller 122 to their operative positions will bring about a similar movement of the tube 135 in the aperture 139, the tube being finally withdrawn from said aperture by means of the handle 137 to again place the spring 136 under tension and being then given a quarter turn to bring the keys or ribs 138 out of registry with the recesses 140 whereby the parts are again all locked in operative position.

The means for maintaining the roller 123 under tension, in the illustrated example, comprises a stem 141 extending through an opening 142 in the member 125 and continued at one end in the form of an extension 143 having a plurality of notches 144 and 144ᵃ and provided at its other end with a ring or handle 145 as shown in Fig. 8. The stem 141 carries a collar 146 slidable thereon and forming an abutment for one end of a spring 147 the other end of which engages a portion of the handle 145, said collar 146 being seated in the opening 142 which is suitably shaped to provide a seat for such collar. In the operative condition of the parts the notch 144 of the extension 143 is engaged with a stationary projection 148 carried by an extension 129ᵃ of the lug 129 thus maintaining the spring 147 under a tension which is communicated to the member 125 and roller 123 and serves to press the latter toward the roller 115. When it is desired to move the roller 123 to an inoperative position the notch 144 of the extension 143 is simply disengaged from the projection 148 which leaves the member 125 and with it the roller 123 free to be swung on the pivot 127, the swinging movement being continued until arrested by an engagement of the notch 144ᵃ with said projection 148 whereby said roller 123 may be supported in an inoperative position or the movement being continued beyond this point if necessary or desired by simply disengaging this notch 144ᵃ from said projection. A return movement of the roller 123 and member 125 will carry the coöperating elements along, so that the spring 147 may be again placed under tension by reëngaging the notch 144 with the projection 148.

The rings 116 are further supported by rollers 149 carried by members 150 pivotally connected at 151 with lugs 152 depending from the base 30, said rollers 149 being maintained under a spring tension by springs 153 having one end secured to the said lugs 152 and the other end fastened to the members 150 as shown in Fig. 3. An additional pressure roller 154 is provided and serves to clamp the rings 116 against the one roller 149, said roller 154 being carried by members 155 preferably forming integral parts of a sleeve 156 rotatably mounted upon a rod 157 supported upon brackets 158 which are secured to the base 30. The sleeve 156 is formed with a lug 159 with which one end of a spring 160 is connected, the other end of said spring being secured to a projection 161 upon the connecting bar of the brackets 158, it being understood that said spring 160 serves to maintain the roller 154 under a tension tending to press it toward the one roller 149 as shown in Fig. 3. In order that the roller 154 may be held in an inoperative position when this is desired or necessary, the one member 155 as shown in Fig. 25 may be provided with a preferably integral arm 162 having a shoulder 163, the latter being arranged to be engaged by a hook 164 carried by a lever 165 pivotally secured at 166 to the brackets 158 and having a lug 167. A spring 168 is located between this lug 167 and a stationary portion of said brackets and serves to press said lever in a direction away from the pivot rod 157 and toward the shoulder 163. Thus as the arm 162 is swung in a direction to move the roller 154 away from the rollers 149, the said hook 164 under the influence of the spring 168 will finally snap over the shoulder 163 as shown by dotted lines in Fig. 25 and hold the said roller 154 in an inoperative position away from the roller 149. The rollers 149 and 154 may all be provided with circumferential grooves in which the rings 116 are located and by means of which said rings are held against unintentional movement in a direction parallel with the axes of said rollers.

For the purpose of still further steadying the rings 116 the machine may include additional rollers 169 carried by a shaft 170 rotatably mounted on a frame 171 which is pivotally connected at 172 with brackets 173, the latter in turn being rigidly secured to the cross-bar 120 as shown in Figs. 2 and 3. These rollers 169 are also preferably provided with circumferential grooves for the accommodation of the rings 116 and are located on the inside of the latter and under a tension tending to press them outwardly against said rings. Any suitable means may be utilized for maintaining said rollers 169 under the described tension as for instance the arrangement shown in Fig. 3 which comprises a spring 174 interposed between the frame 171 and a lug 175 depending from the base of the brackets 173. The opposite ends of the spring 174 are preferably positioned over projections carried respectively by the frame 171 and lug 175 for the purpose of maintaining the spring in its intended position against slipping or displacement.

With the described arrangements the rings 116 are supported in positions in which they pass through the recess 31 of the base 30 and transversely through the circular frame 32 at approximately the center thereof or in other words at spaced points along the horizontal diameter thereof as shown in Figs. 1, 2, 3 and 4, said rings 116 as before stated being spaced from each other as illustrated in Figs. 1, 2, 4 and 26.

During the operation of the machine the rings 116 are given a movement in a circumferential direction at intervals, the extent of movement being preferably predetermined and fixed and successive movements corresponding at all times during a given operation. The mechanism in the illustrated example, for bringing about this operation comprises a lazy tongs 176 terminating at one end in continuing gripping fingers 177 and pivotally secured at 178 to a lug 179 carried by an auxiliary slide 180, the latter being curved and slidable in a curved stationary guide way 181, the curve of which corresponds to that of the rings 116 and is described about a corresponding center as shown in Fig. 3. The opposite ends of the lazy tongs 176 are pivotally connected at 182 with a rod 183 slidably mounted in a bearing 184 carried by said auxiliary slide 180 and terminating in an arm 185 extending at an angle to the rod 183 as shown in Fig. 10. As shown in the latter figure a lever 186 is pivotally mounted at 187 upon the arm 185 and at one end is pivotally connected at 188 with a link 189 the opposite end of which is pivotally connected at 190 with a crank arm 191 carried by a short rock shaft 192. The latter extends transversely through the slide 180 and is journaled thereon and at its inner end carries a similar crank arm 193 provided with a roller 194 adapted to travel in a cam slot or recess 195 formed in a main slide 196, the latter being also curved and slidable in the guideway 181 as shown in Fig. 10, said auxiliary slide 180 being formed with a recess 197 for the accommodation of the crank arm 193 as illustrated in Fig. 13. At its free end the lever 186 is provided with a transverse opening through which a stem 198 slidably extends, said stem being pivotally connected at 199 with the arm 185 and having its free end screw-threaded for the accommodation of a nut or nuts 200, one of which may be a lock nut. A coil spring 201 surrounds said stem and is interposed between said nut or nuts 200 and the lever 186 and thus serves to yieldingly connect the crank arms 191 and 193 with the rod 183, the tension of the spring 201 being adjustable by means of the nut or nuts 200 as will be readily apparent from an inspection of Fig. 10.

It will be understood that two stationary guides 181 with the coöperating gripping devices, slides, and other coöperating elements are provided, one for each ring 116 and that said guides may be secured to or form parts of the supports 53ª and in any event are so located relatively to the positions occupied by the rings 116 in the machine that said rings will each pass between a pair of gripping fingers 177 so as to be capable of being readily gripped thereby in the manner to be more fully explained hereinafter. In order that the gripping fingers 177 may be operated in the intended manner, each main slide 196 is provided at its inner edge with gear teeth 202 which may extend throughout the length of said edge or only over a predetermined portion thereof sufficient to bring about the intended operation and in either case are in mesh with gear wheels 203 mounted upon a shaft 204 journaled on the support 53ª. The said shaft 204 also carries a pinion 205 which meshes with a toothed segment or sector 206 loosely mounted on a shaft or axle 207 having one end mounted in a portion of the support 53ª and its other end mounted in a lug 208 preferably forming an integral part of said support 53ª. An arm 209 is also loosely mounted on the shaft or axle 207 and extends upwardly therefrom in close proximity to the segment 206 as shown in Figs. 1 and 11, the free end of said arm 209 extending alongside of and normally in contact with a rigid projection 210 extending outwardly from the face of the segment 206 as shown in Fig. 11. The said segment further carries a rigid recessed member 206ª in which one end of a coil spring 211 is seated, the other end of said spring being in engagement with the arm 209 and exerting a tension tending to force said arm 209 toward and into contact with the projection 210 as also illustrated in Fig. 11. A roller 212 is rotatably mounted upon said arm 209 and extends into a cam slot 213 formed in the cam 214 as shown in Figs. 6 and 7, said cam 214 being carried by a shaft 215 suitably journaled on the support 53 and also carrying a gear 216 which meshes with a gear 217 mounted upon a counter shaft 218 also journaled on the support 53. This counter shaft 218 carries an additional gear 219 in operative engagement with a gear 220 secured upon the main driving shaft 52 and whereby motion is transmitted through the train of gearing just described to the cam 214.

During the operation of the machine the main slides 196 and auxiliary slides 180 during a part of their movements move together and during another part of their movements travel relatively to each other, the base 179ª of each bracket 179 carried by the auxiliary slides 180 projecting beyond the same into the path of each main slide 196 and serving to arrest the relative movement of the slides in an upward direction and to couple them together to move in unison during the finish of the movement in this direction. The means for arresting the relative movement of the slides in a downward direction and for coupling them together during the finish of the movement in said downward direction comprises projections 180ª located at the lower ends of the slides 180 and extending into the path of the main slides 196. These projections also carry screw-threaded bolts 180ᵇ locked in an adjusted position by lock nuts 180ᶜ and adapted to engage the lower ends of the guideways 181 for the purpose of arresting the combined movement of the slides 180 and 196 in an upward direction when coupled together.

In order to lock the auxiliary slides 180 against unintentional movement at the limit of their movements I provide bolts 193ª and 193ᵇ slidable in transverse recesses 193ᶜ formed in the auxiliary slides 180, springs 193ᵈ being interposed between opposed ends of said bolts and exerting a tension tending at all times to force the bolts apart. Operating members 193ᵉ also located in said recesses 193ᶜ bridge the spaces between each pair of bolts 193ª and 193ᵇ and are formed at opposite ends with shoulders 193ᶠ adapted to engage coöperating shoulders 193ᵍ on said bolts as shown in Fig. 14. The said operating members 193ᵉ are further formed with lugs 193ʰ which extend into recesses 193ⁱ formed in the crank arms 193 so that as the latter are operated by means of the cam-slots 195 the members 193ᵉ will be slidably moved in the recesses 193ᶜ and will alternately withdraw the bolts 193ª and 193ᵇ from their coöperating notches. As clearly shown in Fig. 13 the bolts 193ª coöperate with notches 193ᵏ formed in blocks 193ˡ located in recesses 181ª of the guideways 181 while the bolts 193ᵇ coöperate with notches 193ᵐ formed in similar blocks 193ⁿ located in corresponding recesses 181ᵇ of said guideways 181. The blocks 193ˡ and 193ⁿ are adjustable in the respective recesses 181ª and 181ᵇ so that the notches 193ᵏ and 193ᵐ may be at all times maintained in and adjusted to register perfectly with the bolts 193ª and 193ᵇ. This adjustment of the blocks 193ˡ and 193ⁿ makes it possible to adjust the movement of the auxiliary slide 180 determining the length of feed given to the rings 116 by the gripping fingers 177. The illustrated means for this purpose comprise studs 181ᶜ rotatably secured on the guideways 181 and carrying eccentrically located lugs 181ᵈ projecting through openings 181ᵉ in plates 193ᵒ which carry the blocks 193ˡ and 193ⁿ and which are normally secured against movement by means of screws 193ᵖ. The adjusting devices just described are so arranged that a rotation of the studs 181ᶜ will cause the eccentric lugs 181ᵈ to move the plates 193ᵒ up or down on the guideways 181 whereby the notches 193ᵏ and 193ᵐ may readily be positioned to properly register with the bolts 193ª and 193ᵇ at all times as will be clearly apparent, it being understood that the screws 193ᵖ are first loosened when an adjustment is necessary or desired and again tightened after the proper adjustment has been had. The bolts 193ª and 193ᵇ in coöperation with the notches 193ᵏ and 193ᵐ serve to lock the slides 180 at the end of each movement against unintentional operation as will be more fully set forth further on in the description.

To prevent the rings 116 from being unintentionally moved backward during the recovery of the main gripping fingers 177 and their coöperating parts as will be brought out more fully hereinafter and to still further steady said rings while the cord 67 is being wound thereon I provide auxiliary gripping devices, one for each ring. These auxiliary gripping devices firmly grip the rings during the recovery of the main gripping fingers and thus prevent unintentional backward movement of said rings, and at the same time, in coöperation with said main gripping fingers form guides whereby the cord is properly positioned on said rings during the operation of the machine. As shown in the illustrated example and more particularly in Fig. 8 each auxiliary gripping device comprises a lazy-tong 221 pivotally mounted at 222 upon a stationary bracket 223 secured to the cross-bar 120, said lazy-tongs 221 terminating at one end in gripping fingers 224 similar to the fingers 177, each lazy-tongs having its other end pivotally connected at 225 with a lever 226 loosely mounted on a shaft 227 journaled in bearings 228 depending from the cross-bar 120. The auxiliary gripping device so far described is shown clearly in Fig. 8 of the drawings, it being understood that two such devices are provided one for each ring 116 and that said devices are so located in the machine that the auxiliary gripping fingers 224 occupying positions in which said rings may be readily gripped thereby or in other words so that one ring 116 when in position in the machine passes between each pair of auxiliary gripping fingers 224. The latter also extend into close proximity to the main gripping fingers 177 when these are in their normal positions and are spaced therefrom to a slight degree as shown approximately in Fig. 8, these spaces $a$ representing the points at which the cords 67 pass about the said rings, so that the main and auxiliary fingers coöperate to form guides as before stated and as will be more fully pointed out hereinafter. From the above explanation it will thus be seen that the shaft 227 loosely carries two levers 226 and is long enough and journaled in a manner to make this possible. Each lever 226 is continued in the form of a depending member 229 which at its free end is pivotally connected at 229$^a$ with a stem 230, the latter passing through and being slidable in a suitable transverse opening formed in an arm 231 rigidly carried by the shaft 227. At its free end each stem 230 is screw-threaded for the accommodation of a nut or nuts 232, one of which may be a lock nut, and which serve as an abutment for one end of a coil spring 233 which surrounds the stem 230 and has its other end in engagement with the arm 231. The said arms 231 in addition are each provided with a transversely extending screw-threaded opening for the accommodation of a screw bolt 234 the free end of which engages the coöperating member 229. With this arrangement each lever 226 and its coöperating lazy tongs 221 and gripping fingers 224 is yieldingly or resiliently connected with the shaft 227 as is clearly shown in Fig. 8. At a suitable point the shaft 227 is provided with a crank member 235 which is rigidly secured thereon for instance by means of a set screw 235$^a$ and is pivotally connected with one end of a link 236 which for adjustment purposes may include a turn-buckle 237 or any other device whereby said link may be maintained under the desired tension. The said link 236 extends through registering openings 238 formed in adjacent portions of the support 53 and base 30 and has its other end pivotally connected at 239 with a rocking-lever 240 pivoted at 241 upon the base 30 as shown in Fig. 6. A coil spring 242 surrounds the link 236 in the openings 238 and with one end engages a stationary plate 243 through which said link passes and with its other end abuts against a collar or projection 244 carried by the link as also indicated in Fig. 6. This spring 242 exerts a tension tending to maintain the free end of the rocking-lever 240 in engagement with a roller 245 rotatably mounted at the lower end of a plunger 246 vertically slidable in alining openings 247 formed in opposed portions of the support 53 and base 30. At its upper end the said plunger 246 carries a second roller 248 rotatable about an axis at an angle to the axis of the roller 245 and maintained by means of the spring 242 in surface engagement with the cam 214 and with a cam projection 249 formed thereon and adapted to rotate therewith and actuate said plunger 246 and rocking lever 240 to bring about an operation of the auxiliary gripping fingers 224 as will more fully appear hereinafter.

The operation of the machine is as follows:—Prior to the placing of the rings 116 in operative position in the machine the latter is actuated to bring the section 36$^a$ of the circular member 36 into registry with the section 32$^a$ of the circular frame 32 if this is not already the case. The bolt 40 is then given approximately a half turn by means of the handle 42 to bring it to its releasing position relatively to the recessed member 41 thus unlocking the section 32$^a$ and permitting it to be swung on its pivot 39 to the open position indicated by dotted lines in Fig. 24. The section 36$^a$ is released in a similar manner by moving the latch 44 against the tension of the spring 47 out of the notch 46 and is then swung on its pivot 43 to the dotted position indicated in Fig. 24. By bringing the sections 32$^a$ and 36$^a$ to their inoperative positions as described the continuity of the circular frame 32 and circular member 36 is destroyed and an open space extending transversely through said support and member is provided as will be clear from an inspection of Fig. 24. The rollers 122 are then swung to an inoperative position away from the rollers 114 by rotating the tube 135 to bring the ribs 138 into registry with the recesses 140 and the rollers 123 are similarly swung away from the rollers 115 by releasing the projection 148 from the notch 144 as before described and as will be clearly apparent from an inspection of Fig. 8. The roller 154 is also moved away from the coöperating roller 149 and is held in this position by the coöperative engagement of the hook 164 with the shoulder 163 as indicated by dotted lines in Fig. 25. The above operations thus leave the rollers 114, 115, 149 and 169 free to receive the rings 116 which are successively moved through the space formed by the adjustment of the sections 32$^a$ and 36$^a$ to an inoperative position, into the circular frame 32 and the space 31 of the base 30 and positioned in the grooves of the said rollers after which the rollers 122, 123 and 154 are returned to the normal positions to clamp said rings upon the rollers 114, 115 and 149. The sections 32$^a$ and 36$^a$ are then swung back into operative position and locked therein to again complete the continuity of the circular frame 32 and circular member 36, the parts then occupying the positions shown in Fig. 2. In order to positively maintain the rings 116 in their intended spaced relation against displacement by the tension of the cord 67 exerted during the winding operation, the spreaders or rods 117 may now be placed between the rings at intervals as shown in Fig. 25, said rods being detachably held in position in any suitable manner. A thin sheet of unvulcanized and sticky or tacky rubber $b$ is then preferably combined with the rings 116 so as to extend transversely between and completely around the same in a circumferential direction, the opposite edges of said sheet $b$ being connected respectively with each ring 116 as shown in Fig. 29. The sticky or tacky property of sheet $b$ may be relied upon for securing the opposite edges thereof to the rings 116 or any suitable means may be utilized for this purpose. A spindle 62 with a supply of cord 67 having been previously placed in position in each box or casing 55, cords 67 are passed out of said casings between the rollers 81 and 82 and the free ends thereof are brought into engagement with the rings 116 at substantially opposite points and secured in position in any suitable manner. The tacky or sticky nature of said cords due to their impregnation with rubber may be relied upon to bring about this connection or any other suitable method may be followed if desired. The machine is now ready to start and power is accordingly applied to rotate the pulley 54 and main driving shaft 52 which through the medium of the gear 51 and gear teeth 38 causes the circular member 36 to travel in a circular direction in the raceway 35. This operation of the member 36 carries with it the boxes or casings 55 which thus follow each other in a circular path and owing to the location of the rings 116 pass through them and around them, whereby the cords 67 are wound around said rings and between them as shown in Fig. 4, thus forming two layers of cords 67 located respectively inside and outside of said rings and around the same as shown in said Figs. 4, 28, 30 and 31. As the main shaft 52 is rotated as described the pinion 220 will transmit its motion to the gear 219 which in turn will actuate the counter shaft 218 and thus bring about a rotation of the pinion 217. The latter being in mesh with the gear 216 will actuate same and thus case the shaft 215 to be rotated whereby the cam 214 which is carried by this shaft 215 is also rotated. This operation of the cam 214 will, through the coöperation of the cam slot 213 and roller 212 cause the arm 209 to swing upon the shaft 207 and by engagement with the projection 210 will bring about a movement of the sector 206 in the arc of a circle in the direction indicated by the arrow in Fig. 11. This operation of the sector 206 in turn causes a rotation of the pinion 205, shaft 204 and gear 203 whereby through the medium of the teeth 202 the main slides 196 will be moved downwardly in the stationary guides 181 and owing to the fact that the lower ends of said main slides 196 are in engagement with the projections 180$^a$ at the lower ends of the auxiliary slides 180 will carry the latter along, so that each pair of main and auxiliary slides move downwardly as a unit. Previous to this operation and during the same the rollers 194 of the crank arms 193 occupy a position in the upper end of the cam recesses 195 as shown by dotted lines in Fig. 10 so that each pair of gripping fingers 177 is in gripping engagement with a ring 116 at a point slightly in advance of the points at which the cords 67 bend or wind around said rings. With the crank arms 193 in the upper ends of the cam recesses 195, the bolts 193$^a$ are withdrawn from their coöperating notches 193$^k$, this result having been attained through a coöperation of the projections 193$^h$ and recesses 193$^i$ and a consequent movement of the operating members 193$^e$ whereby the shoulders 193$^f$ thereof have exerted a pressure on the shoulders 193$^g$ of the bolts 193$^a$ and moved the latter out of the notches 193$^k$ thus leaving the auxiliary slides 180 and the main slides 196 free to be moved downwardly together as described. At the same time, the described operations have compressed the springs 193$^d$ between the bolts 193$^a$ and 193$^b$ and moved the lower shoulders 193$^f$ of the members 193$^e$ away from the shoulders 193$^g$ of the bolts 193$^b$ so that the latter ride along the guides 181 under the pressure of the springs 193$^d$ and with a space between their shoulders 193$^g$ and the shoulders 193$^f$ of the members 193$^e$ as shown in Fig. 14. Owing to the fact that the fingers 177 are in gripping engagement with the rings 116, the downward movement of each pair of slides 180 and 196 will cause a pull to be exerted coincidentally on both of the rings 116 whereby said rings are rotated about their own axes upon the supporting rollers. The downward movement of the combined slides 180 and 196 will continue until the bolts 193$^b$ under the influence of the compressed springs 193$^d$ snap into the notches 193$^m$ whereupon further downward movement of said slides is arrested, this movement of the bolts 193$^b$ bringing the shoulders 193$^g$ thereof into engagement with the lower shoulders 193$^f$ of the members 193$^e$. Continued operation of the mechanism now causes the cam slot 213 of the cam 214 to swing the arm 209 in the reverse direction against the spring 211 and thus brings about a movement of the sector 206, pinion 205, shaft 204 and gear 203 in a reverse direction. As the gear 203 is thus operated the main slides 196 will be moved upwardly in the guides 181 independently of the auxiliary slides 180 until the upper ends of said slides 196 engage the bases 179$^a$ of the lugs 179 carried by said auxiliary slides 180. As this independent movement of the main slides 196 takes place the rollers 194 of the crank arms 193 will be transferred from the upper ends of the cam recesses 195 to the lower ends thereof thus rocking the short rock shafts 192 and correspondingly moving the crank arms 191. This actuation of the latter exerts a push on the links 189 which is transmitted to the rods 183 and causes them to slide in the guides 184 and move the lazy tongs 176 on the pivots 178 to swing the fingers 177 to an open position and release the rings 116. At the same time the actuation of the crank arms 193 which is to the left from the position shown in Fig. 13 swings the recess 193$^i$ to the right and exerts a pressure upon the lugs 193$^h$ in the same direction whereby the bolts 193$^b$ are withdrawn from the notches 193$^m$ and the springs 193$^d$ are compressed and press the bolts 193$^a$ against the guides 181 along which they subsequently ride ready to again snap the notches 193$^k$, the upper shoulders 193$^f$ of the members 193$^e$ having been moved away from the shoulders 193$^g$ of the bolts 193$^a$ and thus making it possible for the latter to move independently at the proper time under the influence of said springs. The removal of the bolts 193$^b$ from the notches 193$^m$ is completed at about the time that the independent movement of the main slides 196 brings them into engagement with the bases 179$^a$ of the auxiliary slides 180. As the mechanism continues to operate each pair of slides 180 and 196 will now be moved together in an upward direction as a unit under the actuation of the sector 206 in the described reverse direction, with each pair of fingers 177 in an open position and exerting no effect upon the rings 116, this movement of recovery continuing until the bolts 193$^a$ again snap into the notches 193$^k$ and the parts have resumed their normal positions and until the screw bolts 180$^b$ of the auxiliary slides 180 engage the lower ends of the stationary guides 181. The yielding connection between the arm 209 and the sector 206 through the medium of the spring 211 permits the arm to have a slight independent movement relatively to the sector in case the screw bolts 180$^b$ engage the ends of the guides 181 before the sector 206 has completed its movement in this reverse direction. The screw bolts 180$^b$ may be adjusted to vary the point at which the upward movement of the slides is arrested. As soon as said screw bolts 180$^b$ engage the ends of the guides 181 continued operation of the machine will cause the cam-slot 213 to again move the sector 206 for a short distance in the direction of the arrow in Fig. 11 to move the main slides 196 independently of the auxiliary slides 180 in a downward movement until the lower ends of said main slides 196 engage the projections 180$^a$ of the auxiliary slides 180 whereupon this independent movement of said main slides ceases and the sector 206 remains at rest until again moved farther in the direction of the arrow in Fig. 11 to bring about another downward movement of the combined slides 180 and 196. In other words the cam-slot 213 is so shaped that after the upward movement of the slides or recovery movement of the fingers has been completed, the sectors 206 are given an initial movement to move the main slides 196 in a downward direction independently of the auxiliary slides 180 and are then brought to rest until the time comes to again actuate them as hereinbefore described. This downward movement of the main slides 196 independently of the auxiliary slides 180 is possible because the latter are held against movement by the bolts 193$^a$ in the notches 193$^k$ and results in transferring the rollers 194 back to the upper ends of the cam recesses 195, whereby the crank arms 193 are swung back to the position indicated in Fig. 13. This return movement of said crank arms 193 not only withdraws the bolts 193$^a$ from the notches 193$^k$ so that the slides 180 and 196 are again ready for another coincident downward movement but also swings the crank arms 191 in a direction to exert a pull on the links 189 and slides 183 whereby each pair of fingers 177 is again brought together into a gripping engagement with each ring 116 ready to again and immediately move the rings 116 in a circumferential direction at the proper time. As the slides 180 and 196 begin to move in unison in a downward direction and the fingers 177 begin to exert a pull on the rings 116 to rotate them about their axes, the rotation of the cam 214 will cause the projection 249 thereof to depress the plunger 246 and thus to rock the lever 240 on its pivot 241 and raise the link 236 against the tension of the spring 242. This causes a rocking of the member 235, shaft 227, and arms 231 whereby the screw-bolts 234 are pressed against the depending members 229 and swing the latter and with them the levers 226. The movement of the latter is such that the pivots 225 will be caused to approach the fixed pivots 222 and thus operate the lazy tongs 221 to move the fingers 224 to an open position to release the rings 116, which being in this manner freed from restraint are free to be rotated in the described manner by the gripping fingers 177 and the coöperating mechanism.

It will thus be seen that while the casings or boxes 55 are rotated transversely of and through the rings 116 to wind the cords 67 thereon, that the rings 116 are periodically moved in circumferential direction to a predetermined and fixed extent, so that the points at which the cords 67 are bent or curved about the rings 116 are advanced each time. This results in winding the cords 67 upon the rings 116 in such a manner that said cords instead of extending between said rings in a direction parallel to the axes thereof or approximately perpendicular to the planes of the rings extend diagonally between the same at any desired angle, and preferably at an angle of approximately 45° to the rings. It will be understood that the two cords 67 are simultaneously applied under and over the sheet of rubber b the windings proceeding continuously from opposite sides and the operations to periodically advance the rings being successively continued until the rings have been completely wound, the cords 67 being laid side by side and closely adjacent to each other until a complete inner and outer layer of cords has been formed about the rings 116. At the moments when the casings 55 are approaching and leaving the positions shown in Fig. 4, or in other words while the cords 67 are being bent around the rings 116 the fingers 177 and auxiliary fingers 224 are in gripping engagement with said rings 116 and in close proximity with each other and form guides between which the bends of the cords 67 about the rings take place as shown at a in Fig. 8. In this manner the cords 67 are properly wound about the rings in close proximity and in fact in contact with each other so that the inner and outer layers of cords are compactly wound. The periodical circumferential movements of the rings take place during the time that the casings or boxes 55 travel from the positions shown in Fig. 4 through arcs of approximately 180° or in other words reverse their positions through substantially a half revolution of the circular member 36. With this arrangement each successive bend of the cord about the rings 116 is located at a point in advance of the preceding point until the cycle has been completed whereupon the same operations are repeated to lay the next windings of cords alongside the preceding one. This as before stated is continued until complete inner and outer layers of cords have been formed the convolutions of which extend diagonally across the space between the rings 116. After the final winding has been completed the free ends of the cords 67 may be secured to the rings 116 in any suitable manner as for instance through the medium of the tackiness of said cords.

As the rings 116 become gradually covered with the cord windings the fingers 224 and 177 instead of directly gripping the said rings will engage the layers of cords and thus will not close to the same extent as originally. This variation in the gripping movement of said fingers is readily permitted through the medium of the springs 201 and 233 and the yielding connections of which they respectively form a part, without interfering with or changing the operation of the apparatus. The cord 67 is maintained under a uniform tension by means of the braking or tension device shown in Fig. 18. If for instance the spindles 62 rotate at an increased speed from any cause and thus unwind the cord 67 at a too rapid rate the rollers 71 and arms 72 will, under the influence of the springs 75 be swung outwardly relatively to the casings 55. This operation will rock the shafts 73 and with them the cams 74 in such a manner that the pressure of the springs 98 will force the rods 95 toward the shafts 73 and they thus swing the arms 89 in a direction tending to apply the brake bands 85 and cushions 86 to the surfaces 84 whereby the rotation of the spindles 62 is arrested or reduced until the intended conditions have again been reached. After the speed of the spindles has been retarded or completely arrested or at other times if the speed at which the cords leave the spindles 62 is too slow the rollers 71 and arms 72 will be moved inwardly against the tension of the springs 75 and will thus rock the shafts 73 and cams 74 in a reverse direction. This will cause said cams to exert a pressure on the rollers 97 and rods 95 against the tension of the springs 98 and will consequently swing the arms 89 in a direction whereby the brake bands 85 and cushions 86 are moved away from the surfaces 84 of said spindles 62. The unwinding movement of the cords is therefore always automatically under control and the tension of said cords is always maintained at a substantially constant point by said rollers 71, arms 72 and springs 75.

If the rolls or spools of cord include the fabric 68 between the layers thereof, the free end of said fabric 68 is connected until the take up rollers 100 which rest upon the surface of the spools or rolls of cord as shown in Fig. 18 and by frictional and surface contact therewith are rotated in a direction opposite to that at which the spindles 62 are rotated. As the unwinding of the cord proceeds as hereinbefore described the fabric 68 will be coincidentally wound upon the take up rollers 100 and will thus be prevented from interfering with the intended operation of the machine. During this operation any changes in the relative positions of the spindles 62 and take up rollers 100 due to the decrease in the diameters of the spools of cord 67 and increase of diameter of the fabric windings on the rollers 100 will be compensated by the springs 107 so that the proper operative correlation will at all times be automatically maintained. During the winding operation the braces or spreaders 117 prevent the tension exerted by the cords 67 from drawing the two rings together as will be readily apparent, these braces 117 lying between the rubber sheet $b$ and the inner layer of cords when the winding operation has been completed. When this state has been reached the section 36$^a$ of the circular member 36 is brought into juxtaposition to the section 32$^a$ of the circular support 32, after which these sections 32$^a$ and 36$^a$ are again swung to the dotted positions shown in Fig. 24 to provide a space through which the completed unit or tubular cylinder may be readily removed from the machine. It will be understood that previous to this removal the rollers 122, 123 and 154 have been moved to inoperative positions to release the covered rings and further that in some cases any or all of these rollers may be dispensed with. During the winding of the cords, the supporting devices for said rollers permit them to accommodate themselves to the varying conditions as the winding proceeds and as the rings become covered with the cords 67. After the finished unit has been removed from the machine as described the spreaders 117 may be removed by separating the strands of the inner cord layer to a slight extent at the necessary points to provide spaces through which said spreaders may be withdrawn.

It will be evident that the machine will operate equally well with a single casing 55 and single cord 67 although with such arrangement the speed of the winding operation will be reduced or in other words the time necessary to complete a given operation will be increased. It will also be apparent that additional casings and cords may be included although the illustrated arrangement is preferred as it provides a balanced construction which is regular and constant in operation with a maximum of smoothness and a minimum of vibration.

The apparatus is extremely simple in construction and reliable in operation and is capable of turning out completed units of a constant and fixed quality at extremely high speed and with a very high degree of efficiency.

Various changes, other than those suggested, may be made within the scope of the claims without departing from the spirit of my improvement.

I claim:

1. In a machine of the kind described, means for supporting a pair of annular members in spaced, parallel relation to each other, means for winding a cord continuously between said annular members to form a cord layer extending circumferentially of said annular members and means for positively engaging said annular members whereby the latter are periodically pulled in a circumferential direction and for a uniform, specific, predetermined distance whereby the cord winding extends diagonally in a continuously uniform manner across the space between said annular members.

2. In a machine of the kind described, means for supporting a pair of rings in spaced, parallel relation to each other, means for winding a cord continuously between said rings to form a cord layer extending circumferentially of said rings and means for positively engaging said rings whereby the latter are periodically pulled to a predetermined and corresponding extent in a circumferential direction whereby the cord winding extends diagonally across the space between said rings at a predetermined angle.

3. In a machine of the kind described, means for supporting a pair of rings in spaced, parallel relation to each other, means for winding a cord continuously about and between said rings to form inner and outer cord layers extending circumferentially of said rings and means for positively engaging said rings whereby the latter are periodically pulled to a predetermined and corresponding extent in a circumferential direction whereby the cord winding extends diagonally across the space between said rings at a predetermined angle, the cords in the outer and inner layers extending in directions which intersect each other.

4. In a machine of the kind described, means for supporting a pair of rings in spaced, parallel relation to each other, means for winding a cord continuously about and between said rings to form cord layers extending circumferentially of said rings, gripping fingers, means for actuating said fingers to alternately grip said rings and to release same, and means for periodically moving said fingers while gripping the rings in one direction to pull said rings to a predetermined extent in a circumferential direction whereby the cord winding extends diagonally across the space between said rings at a predetermined angle and for moving said fingers after having released the rings in a reverse direction relatively to said rings.

5. In a machine of the kind described, means for supporting a pair of rings in spaced, parallel relation to each other, means for winding a cord continuously about and between said rings to form cord layers extending circumferentially of said rings, gripping fingers, and mechanism for closing said fingers about said rings and for periodically moving them in one direction to periodically actuate said rings in a circumferential direction whereby the cord winding extends diagonally across the space between said rings and for opening said fingers to release said rings and for moving them back in the reverse direction relatively to said rings.

6. In a machine of the kind described, means for supporting a pair of rings in spaced, parallel relation to each other, means for winding a cord continuously about and between said rings to form cord layers extending circumferentially of said rings, gripping fingers, mechanism for closing said fingers about said rings and for periodically moving them in one direction to periodically actuate said rings in a circumferential direction whereby the cord winding extends diagonally across the space between said rings and for opening said fingers to release said rings and for moving them in the reverse direction relatively to said rings and means included in said mechanism whereby the closing movement of the fingers may vary without affecting the remainder of said mechanism.

7. In a machine of the kind described, means for supporting a pair of rings in spaced, parallel relation to each other, means for winding a cord continuously about and between said rings to form cord layers extending circumferentially of said rings, gripping fingers, means for actuating said fingers to alternately grip and release said rings, means for periodically moving said fingers while gripping the rings in one direction to actuate said rings in a circumferential direction whereby the cord winding extends diagonally across the space between said rings and for moving said fingers after having released the rings in a reverse direction relatively to said rings and means for maintaining said rings against movement during the return movement of said fingers.

8. In a machine of the kind described, means for supporting a pair of rings in spaced parallel relation to each other, a circular support extending through said rings, a circular member movably mounted on said support, movable sections on said support and member adapted to be brought into registry and moved out of said support and member respectively to provide a space through which said rings may be inserted in position, a supply of cord carried by said circular member, means for moving said circular member in said support whereby said cord is wound about and between said rings, means for maintaining said cord under a substantially constant tension during winding, stationary guideways located adjacent to said rings, slides arranged in pairs and movable in said guideways, main gripping fingers carried by said slides and adapted to grip said rings, means for actuating said slides to operate said main gripping fingers and to move them in one direction to actuate said rings in a circumferential direction whereby said cord is diagonally wound between said rings and in the opposite direction relatively to said rings, auxiliary gripping fingers adapted to grip said rings and means arranged to cause said auxiliary gripping fingers to grip and hold said rings during the return movement of said main fingers and to move said auxiliary fingers to an open position prior to the beginning of the movement of said main gripping fingers whereby said rings are circumferentially moved.

9. In a machine of the kind described, means for supporting a pair of rings in spaced parallel relation to each other, means for winding a cord continuously between said rings to form a cord layer extending circumferentially of said rings, gripping fingers adapted to grip each ring and move the same in a circumferential direction whereby said cord is diagonally wound between said rings, stationary guideways adjacent to said rings, a pair of slides movable in said guideways and operatively connected with said gripping fingers, said slides being movable relatively to each other and as a unit to actuate said gripping fingers, means for locking one slide of each pair at predetermined points to permit an independent movement of the other slide of each pair, means for coupling said slides together and mechanism for actuating said slides.

10. In a machine of the kind described, means for supporting a pair of rings in spaced, parallel relation to each other, means for winding a cord between said rings to form a cord layer extending circumferentially thereof, shifting means for periodically moving said rings in a circumferential direction, and maintaining means for positively holding said rings against movement during the movement of recovery of said shifting means.

11. In a machine of the kind described, means for supporting a pair of rings in spaced, parallel relation to each other, means for winding a cord between said rings to form a cord layer extending circumferentially thereof, gripping fingers arranged in coöperating pairs to grip said rings and to release same, means including lazy-tongs whereby said fingers are operated, and means for periodically shifting said fingers, while gripping the rings, to move the latter in a circumferential direction, and for shifting said fingers, after having released said rings, in a reverse direction relatively thereto.

12. In a machine of the kind described, means for supporting a pair of rings in spaced, parallel relation to each other, means for winding a cord between said rings to form a cord layer extending circumferentially thereof, gripping fingers arranged in coöperating pairs to grip said rings and to release same, means including lazy-tongs whereby said fingers are operated, means for periodically shifting said fingers, while gripping the rings, to move the latter in a circumferential direction and for shifting said fingers, after having released said rings, in a reverse direction relatively to the latter, additional gripping fingers arranged in coöperating pairs to grip said rings and maintain them against movement during the reverse movement of said first named fingers and means including lazy-tongs for actuating said additional gripping fingers in opposition to said first named fingers.

In testimony whereof I have hereunto set my hand.

FRED B. CARLISLE.